United States Patent
Noetzel et al.

[11] 3,894,126
[45] July 8, 1975

[54] PHOSPHORUS CONTAINING BUTADIENE-1,3-TELOMERS

[75] Inventors: Siegfried Noetzel, Kelkheim, Taunus; Edgar Fischer, Frankfurt am Main, both of Germany

[73] Assignee: Hoechst Aktiengesellschaft, Frankfurt am Main, Germany

[22] Filed: June 10, 1974

[21] Appl. No.: 477,835

[30] Foreign Application Priority Data
June 12, 1973  Germany............................ 2329784

[52] U.S. Cl........... 260/956; 260/502.4 P; 260/969; 260/970
[51] Int. Cl. .............................................. C07f 9/40
[58] Field of Search..................... 260/956, 970, 969

[56] References Cited
UNITED STATES PATENTS
2,478,390   8/1949   Hanford et al.................. 260/459 R FOREIGN PATENTS OR APPLICATIONS
682,163   11/1952   United Kingdom

*Primary Examiner*—Anton H. Sutto
*Assistant Examiner*—Richard L. Raymond
*Attorney, Agent, or Firm*—Curtis, Morris and Safford

[57] ABSTRACT

Phosphorus containing butadiene-1,3 telomers soluble in organic solvents and corresponding to the formula

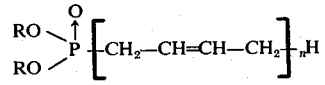

and a process for the preparation thereof, using chain transferring agents, at elevated pressures and temperatures.

2 Claims, No Drawings

PHOSPHORUS CONTAINING BUTADIENE-1,3-TELOMERS

The present invention relates to phosphorus containing butadiene-1,3 telomers and their preparation.

It is known to react polymerizable vinyl compounds of the formula $CH_2=CH-R$, where R is an alkyl or aryl radical, in the presence of a compound AB and an initiator, to form polymers of the formula

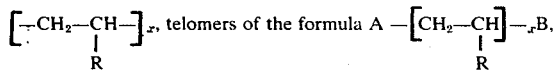

where x stands for the number of basis components, or an addition product of the formula $$A - CH_2-CH-B.$$
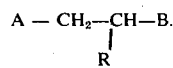

Thus, according to U.S. Pat. No. 2,440,800, 1-olefins such as ethylene, propylene, isobutylene or styrene are reacted with chloroform, carbon tetrachloride or sulfuryl chloride as telogens under radicalforming conditions.

It is also known to prepare phosphorus containing telomers by reaction of 1-olefins with dialkyl phosphites. According to U.S. Pat. No. 2,478,390, ethylene is telomerized with diethyl phosphite in the presence of organic peroxides, for example dibenzoyl peroxide, at elevated pressures and temperatures. In this process, compounds containing one or two ethylene units per molecule are formed as main products, and telomers having more than 2 ethylene units per molecule are formed only in small amounts. In British Pat. No. 660,918, the reaction of 1-hexene with diethyl phosphite and of 1-decene with dibutyl phosphite under radical-forming conditions to yield products having one or two hexene or decene components per molecule is described. J. Am. Chem. Soc. 80, 714 (1958) and 79, 1961 (1957) describe the telomerization of 1-octene with dibutyl phosphite and of vinyl acetate with diethyl phosphite. Subjects of U.S. Pat. Nos. 2,559,754 and 2,786,827 are the telomerization of tetrafluorethylene and trifluoro-monochloro-ethylene with diethyl phosphite.

From the chemistry of low molecular compounds it is furthermore known that phosphorus compounds capable of being added may be added on olefinic compounds via free radicals; depending on the number of the double bonds present, 1:1 or 2:1 addition products being formed. Thus, according to Houben-Weyl, vol. 12/1, pp. 463, 464 and 466 (Table 47), dialkyl phosphites are added on mono-olefins such as ethylene, butene-2, octene-1, hexene-1, styrene or cyclohexene to form the corresponding phosphonic acid dialkyl esters, and di-olefins, for example divinyl ether, are converted to the corresponding mono- and bis-phosphonic acid dialkyl esters. U.S. Pat. No. 2,957,931 claims the addition via free radicals of acetylene, acetylenically unsaturated compounds or styrene on phosphorus compounds capable of being added, such as dialkyl phosphites. According to the same patent, isopropene reacts with dibutyl phosphite to form insoluble cross-linked products.

British Pat. Nos. 677,774 and 682,163 describe the polymerization of diolefins, for example butadiene-1,3, in bulk and in solution, with free radical initiating catalysts to form low molecular weight polymers which may be used as drying oils. As solvents, inert solvents such as butane, xylene, benzene, toluene or cyclohexane, or non-inert solvents such as carbon tetrachloride, chloroform or halogenated hydrocarbons boiling at temperatures of from 60° to 200°C may be used in this case. German Auslegeschrift No. 1,255,318 describes the preparation of butadiene-1,3 telomers, which are obtained by free radical initiated polymerization of butadiene-1,3 in the presence of aliphatic hydrocarbons having a tertiary carbon atom, aliphatic alcohols, halogenated hydrocarbons or compounds of the cumene type.

The present invention provides novel butadiene-1,3-telomers of the formula

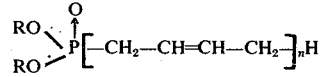

where R is a lower straight-chain or branched alkyl radical having from 1 to 8 carbon atoms and n an integer of from 3 to 30, preferably from 5 to 20.

The present invention provides furthermore a process for the preparation of butadiene-1,3 telomers soluble in organic solvents and corresponding to the formula

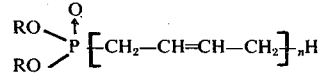

where R and n are as defined above, which comprises reacting butadiene-1,3 with dialkyl phosphites the alkyl groups of which are as defined above at elevated pressures and temperatures in the presence of an amount of from 0.5 to 10 % by weight, relative to butadiene-1,3, of a free radical initiating catalyst, optionally with addition of chain transferring agents.

As free radical initiating catalyst, organic peroxides are preferably used.

It is surprising to observe that by this method phosphorus containing butadiene-1,3 telomers soluble in organic solvents which comprise more than three monomer components per telomer molecule are obtained with good yields.

As telogens for the telomerization of butadiene-1,3, dialkyl phosphites the alkyl radicals of which have from 1 to 8 carbon atoms and may be straight-chain or branched are used, for example dimethyl phosphite, diethyl phosphite, dipropyl phosphite, di-n-butyl phosphite, di-isobutyl phosphite or dioctyl phosphite. As free radical initiating catalysts, peroxides that decompose at a temperature of from 70° to 160°C, for example dibenzoyl peroxide, di-tert-butyl peroxide, t-butylhydroperoxide, dicumyl peroxide or t-butylperbenzoate are used. The telogen is advantageously used in a 0.1 to 8 molar excess, relative to the butadiene-1,3. The concentration of initiating catalyst is from 0.5 to 10 % by weight, relative to the butadiene-1,3 to be telomerized; preferably, a concentration of from 2 to 8 % by weight is used. As chain transferring agents, those compounds are used which have a pronounced chain-breaking activity, above all sulfur compounds such as n-butylmercaptan on butadiene-1,3. Furthermore, solvents having a high transferring constant such as benzene, cyclohexane, toluene, ethylbenzene or cumene may be added. The amount of solvent used is from 0.1 to 10 parts by volume per part by volume of butadiene-1,3. The telomerization requires temperatures of from 100° to 200°C and pressures of from 1 to 50 atm/g.

For carrying out the process of the invention, the butadiene-1,3, the dialkyl phosphite and the catalyst are introduced into the autoclave and heated to the desired temperature. It is also possible to introduce first the dialkyl phosphite, to heat it to the desired temperature, and to add then the butadiene-1,3 and the catalyst. When the reaction is complete, the non-reacted dialkyl phosphite is removed by distillation.

The butadiene-1,3 telomers obtained in accordance with the present invention are clear viscous liquids which are interesting intermediate products. They may be saponified with splitting-off of the alcohol radical to form long-chain phosphonic acids, and they may be further reacted at their CC double bonds. They may be applied as plasticizers and anti-corrosion agents, and used for the preparation of coatings hardening by oxidation or via the free radicals.

The following examples illustrate the invention.

EXAMPLE 1

414 g of diethyl phosphite and 4.5 ml of di-tert.-butylperoxide (6% by weight relative to butadiene-1,3) are introduced into an autoclave made of V4A steel and having a capacity of 1 liter and subsequently flushed with nitrogen. From a pressure feeder device mounted on top of the autoclave, 81 g of 1,3-butadiene are pressed into the autoclave at an overpressure of 5 atm/g (atmospheres gauge). A starting pressure of 3 atm/g establishes itself. After heating to 140°C within 4 hours, a pressure of about 9 atm/g is attained. The temperature of 140°C is maintained for 5 hours; the pressure dropping to 4 atm/g during this period. The contents of the autoclave are then discharged by rinsing with benzene, and the benzene and the excess diethyl phosphite are distilled off under normal pressure in a rotation evaporator. Subsequently, the reaction mixture is heated for about 1 hour at a pressure of 2 mm and an oil bath temperature of 100° C until the constant weight is attained. 70 g of a viscous mass are obtained which at the start is slightly turbid, but later on becomes clear and which is soluble in chloroform, benzene or toluene. An elementary analysis gave the following result:

C 81.8%   H 10.9%   P 2.8%

For a telomerization degree of $n = 20$, corresponding to a molecular weight of 1218, the following theoretical data are calculated:

C 82.7%   H 10.8%   P 2.5%

EXAMPLE 2

The operations are the same as in Example 1, but 20 ml of toluene are added. 64 g of a viscous mass that becomes clear after standing for some time and that is soluble in chloroform or benzene are obtained, the analysis data of which are as follows:

C 77.6%   H 10.4%   P 4.9%.

These data correspond to products of the telomerization degree of $n = 10$, corresponding to a molecular weight of 678 and to the following theoretical composition:

C 77.8%   H 10.5%   P 4.6%.

EXAMPLE 3

Instead of the 414 g of diethyl phosphite cited in Example 1, 498 g of dipropyl phosphite are used. Under the process conditions as indicated in Example 1, 92 g of a clear viscous mass that is soluble in chloroform or benzene are obtained, the elementary analysis of which gives the following results:

C 79.0%   H 11.0%   P 3.4%.

For a telomerization degree of $n = 15$ corresponding to a molecular weight of 976, the following data are calculated:

C 80.1%   H 10.8%   P 3.2%.

What is claimed is:
1. Butadiene-1,3 telomers of the formula

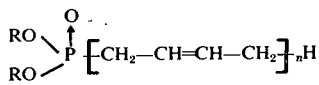

where R is a lower straight-chain or branched alkyl radical having from 1 to 8 carbon atoms and $n$ an integer of from 3 to 30.

2. Butadiene-1,3-telomers as claimed in claim 1, where $n$ is an integer of from 5 to 20.

* * * * *